United States Patent

White

[15] 3,660,878
[45] May 9, 1972

[54] REVERSIBLE CUTTER AND HOLDER ASSEMBLY THEREFOR

[72] Inventor: James E. White, Pasadena, Calif.

[73] Assignee: Poly-Mech Products, Incorporated, Pasadena, Calif.

[22] Filed: Jan. 7, 1970

[21] Appl. No.: 1,214

[52] U.S. Cl............................................................29/98
[51] Int. Cl..........................................................B26d 1/00
[58] Field of Search...................................29/98, 102, 102 A

[56] References Cited

UNITED STATES PATENTS

| 1,330,408 | 2/1920 | Smith | 29/102 A |
| 2,346,084 | 4/1944 | Sanocki | 29/98 |

FOREIGN PATENTS OR APPLICATIONS

| 19,587 | 3/1911 | Great Britain | 29/98 |
| 417,540 | 10/1934 | Great Britain | 29/102 |
| 575,212 | 3/1946 | Great Britain | 29/102 |
| 407,354 | 10/1944 | Italy | 29/102 |
| 836,880 | 10/1938 | France | 29/102 |

*Primary Examiner*—Harrison L. Hinson
*Attorney*—Sellers and Brace

[57] ABSTRACT

A machine tool cutter and holder assembly therefor, the cutter having a circular head deeply notched to provide a pair of identical cutting edges usable alternatively at the user's option simply by inverting the cutter in the mounting assembly to bring a selected cutting edge into cutting position. The clamping jaw of the holder assembly includes a fulcrum rendering the jaw self-centering with respect to the cutter shank and the seating recess therefor provided in the fixed main holder member. The cutting edges can be resharpened and restored to their original efficiency repeatedly.

4 Claims, 5 Drawing Figures

PATENTED MAY 9 1972 3,660,878
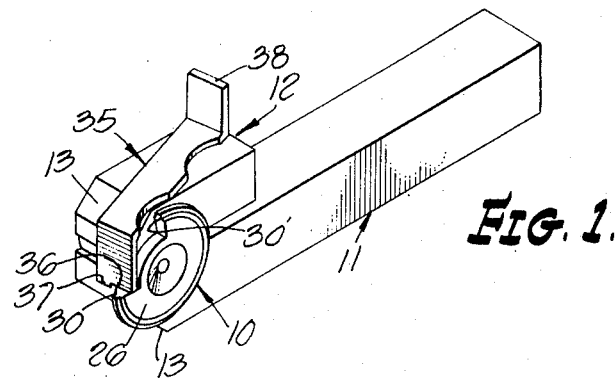
FIG. 1.
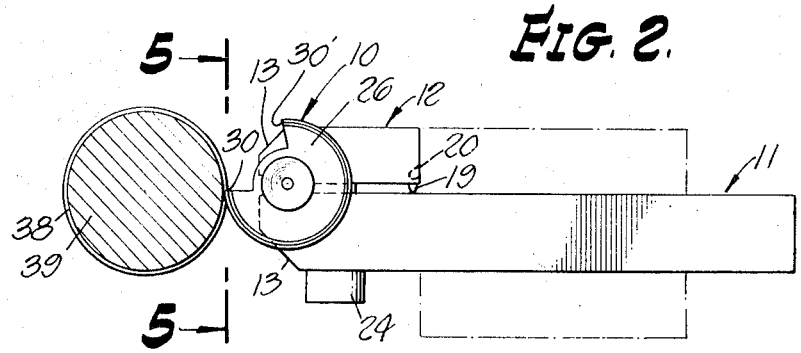
FIG. 2.
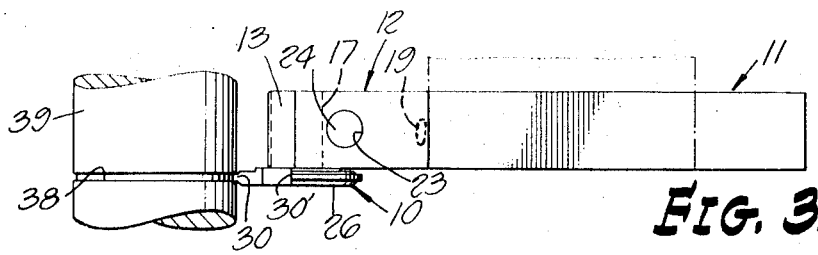
FIG. 3.
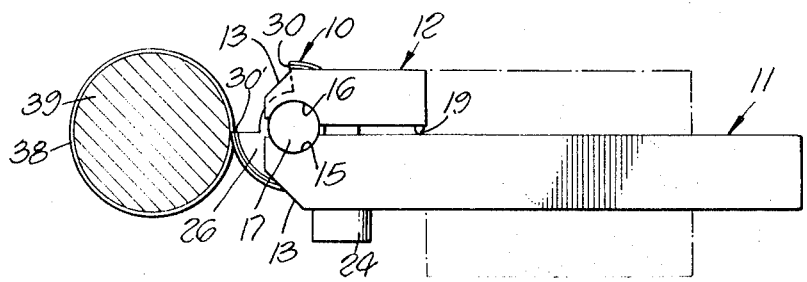
FIG. 4.
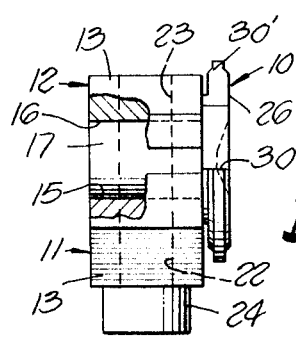
FIG. 5.
JAMES E. WHITE
INVENTOR
BY
ATTORNEYS

REVERSIBLE CUTTER AND HOLDER ASSEMBLY THEREFOR

This invention relates to machine tool cutters and more particularly to an improved holder assembly and a reversible cutter clampable therewithin.

The invention cutter is formed in one unitary piece of homogenous material comprising a circular cutter head having a cylindrical mounting shank projecting from one of its faces. The cutter head is deeply notched and accurately finished at its opposite ends to provide a pair of identical cutting edges usable alternatively and selectively by the simple expedient of inverting the cutter in the holder assembly. The cutter head is of uniform cross section throughout its circumference with the result that the cutting edges can be reconditioned repeatedly to restore the sharpness and cutting efficiency thereof. After a given reconditioning operation the cutter can be used for a prolonged period as first one and then the other of its cutting edges is used in a particular machining operation.

The holder assembly is formed from simple, bar stock with one longer component clampable in a suitable anchorage and the shorter component serving as the adjustable clamping jaw and cutter. An arcuate fulcrum provided on the inner side of the clamping jaw bears against the main holder member rendering the clamping jaw self-centering with respect to the cutter mounting shank and the seating recess therefor in the main holder member.

Accordingly, it is a primary object of the present invention to provide an improved machine tool cutter provided with a pair of identical cutting edges selectively usable at the user's option.

Another object of the invention is the provision of an improved reversible cutter head which can be sharpened and reconditioned repeatedly.

Another object of the invention is the provision of a reversible cutter mountable in a simple, rugged, self-centering holder assembly.

These and other more specific objects will appear upon reading the following specification and claims and upon considering in connection therewith the attached drawing to which they relate.

Referring now to the drawing in which a preferred embodiment of the invention is illustrated:

FIG. 1 is a perspective view of an illustrative embodiment of the reversible cutter clamped in the improved holder assembly therefor and also showing a gauging tool in one of its several modes of use;

FIG. 2 is a side elevational view of the cutter and holder assembly in cutting position with respect to a work piece;

FIG. 3 is a top plan view of FIG. 2;

FIG. 4 is a view similar to FIG. 2 but showing the cutter inverted with its second cutting edge in operating position; and FIG. 5 is an end elevational view taken along line 5—5 on FIG. 2 and showing a portion of the holder clamping jaws broken away.

Referring to the drawing, there is shown an illustrative embodiment of the invention cutter 10 supported in one of its two operating positions in a holder assembly adapted to be clamped in known manner to a machine tool. The holding assembly comprises a main holder member 11, a clamping jaw 12, and a clamping screw 24. Holder member 11 can be clamped in a turret head, a cross slide or in any other appropriate cutting tool holder in a manner well known to those skilled in the machine tool art.

The holder assembly is preferably made of high strength bar stock as, for example, the square bar stock illustrated in the drawing. The advance outer end corners of both the holder member and the clamping jaw are preferably cut off on a bevel, as is indicated at 13 in FIG. 2. The adjacent sides of the assembled holder members are provided with identical semi-circular recesses 15,16 having the same diameter as that of the mounting shank 17 for cutter 10. As is made clear by FIGS. 2 and 4, the depth of recesses 15,16 is somewhat less than the radius of shank 17 in order that the recesses will seat firmly against the opposite sides of shank 17 without risk of the adjacent faces of members 11,12 contacting one another.

It is important to the proper functioning of the invention reversible cutter that the holder assembly be self-centering and capable of supporting the cutter in precisely the same plane irrespective of which of its two identical cutting edges is in use. This important objective is achieved by the provision of an arcuate fulcrum 19 formed centrally of the underside of clamping jaw 12 closely adjacent its inner end. Fulcrum 19 is most conveniently formed by upsetting the inner end of jaw 12 closely against its lower transverse edge using a suitable forming tool to provide a generally arcuate shaped protrusion the surface of which is then accurately finished to provide the arcuate fulcrum 19. The indentation indicated by dotted line 20 in FIG. 2 indicates metal displaced from the end of the clamping jaw to form the downwardly projecting fulcrum 19. It will be understood that the plane of the desired arcuate surface is parallel to the end of the clamping jaw. As will be recognized, this fulcrum permits the clamping jaw to rock to the right or to the left crosswise of the holder assembly to the extent necessary to seat firmly against the upper side of cutter mounting shank 17. In this manner, assurance is provided that the mounting shank will always seat firmly in the lower recess 15 with its axis in precisely the same plane whether the cutter proper lies in a vertical plane on one or the other of the two lateral sides of the holder assembly.

As is best shown in FIG. 5, holder member 11 and clamping jaw 12 are provided with aligned openings 22,23 spaced closely behind recesses 15,16 to receive a clamping screw 24. The latter fits loosely within bore 22 with its threads mating with those of bore 23. Cutter 10 is formed in one piece from metal of a type suitable for machining other metal, such as tungsten carbide, or the like. The one piece cutter has a circular head 26 of uniform shape and thickness throughout and preferably formed with an integral mounting shank 17 of the same material.

The circular head 26 is deeply notched substantially to the base of its mounting shank 17 to provide a pair of identical cutting edges 30,30'. As herein shown, these cutting edges are spaced apart somewhat more than 90 degrees initially. Preferably the two cutting edges are not formed in a radial plane but in a plane parallel to and offset slightly from a diametric plane through the center of the mounting shank. Thus it will be noted from FIGS. 2 and 3 that the plane of cutting edge 30 is spaced a few mils below a horizontal plane through the shank axis. Likewise a plane passing through the corresponding surface of cutting edge 30' will be located a similar distance to the right and parallel to a diametric plane through the shank axis. Desirably the described disposition of the cutting edges relative to the shank axis is maintained throughout the service life of cutter 10 by appropriate grinding and sharpening of the cutting edges during the life of the cutter.

As herein shown, cutting edges 30,30' are ground to provide a rake angle of 5°. It will be understood that the appropriate rake angle varies, most operations providing best results with a rake angle of either 5° or 10°. If the higher rake angle is desired, then cutting edges 30,30' lie in planes spaced at a corresponding greater distance from the remote sides of the described diametric planes.

It is convenient and customary to sharpen and recondition the cutting edges while the cutter is mounted in the holder assembly. The plane of the cutting edges can be accurately checked using gauging tool 35 illustrated in FIG. 1. This tool is made from stiff sheet metal with its ends projecting in opposite directions. One end corner is finished to provide a 5° rake gauge surface 36 and the other is finished to provide a 10° rake angle gauge surface 37. In use, the mid-portion of the gauge is placed flush against the top of the clamping jaw with the appropriate one of gauge surfaces 36,37 bearing against the newly reconditioned cutting edge. If the gauge surface makes bare contact with the full length of the cutting edge as the gauge body is held pressed against jaw 12 then it is known that the cutting edge has been properly ground.

The other slightly shorter end 38 of the gauge is used to check the proper operating position for the cutter. This is done by inverting the gauge so that end 38 bears against the tip of the cutting edge, the clamping screw 24 being slightly tightened during this operation to permit rotational adjustment of the cutter in seating recesses 15,16. Once the cutter has been rotated to its proper cutting position as determined in the manner described, clamping screw 24 is firmly tightened.

After a period of use of the cutter to cut a groove 38 in a work piece 39, the cutting edge 30 may become too dull for further high quality work, or this cutting edge may have become damaged for some reason. In either event, the operator can continue the cutting operation after the very brief delay required to bring the second cutting edge 30' into operation. The operator merely loosens clamping screw 24, withdraws cutter 10 from the holder assembly and reinserts shank 17 into recesses 15,16 from the opposite side of the holder assembly. End 38 of gauge 35 is then employed in the manner described above to check the position of edge 30' as clamping screw 24 is retightened. The same cutting operation can then proceed on the same work piece after shifting the cross slide or other support for the holder assembly the slight distance necessary to bring the cutter into axial alignment with the cut then being made.

Although the invention has been described in connection with a cutter shaped to form a shallow groove with chamfered rim edges, it will be understood that the cutter may be formed with circular heads of a wide variety of contours and capable of forming innumerable shapes and types of machining operations on a work piece. The principles of the present invention provides the workman with cutters having duplicate cutting edges which may be substituted for one another quickly and with a minimum of delay and effort. It is therefore readily apparent that the invention has numerous and important advantages over prior practice.

While the particular reversible cutter and holder assembly therefor herein shown and disclosed in detail is fully capable of attaining the objects and providing the advantages hereinbefore stated, it is to be understood that it is merely illustrative of the presently preferred embodiment of the invention, and that no limitations are intended to the details of construction or design hereinshown other than as defined in the appended claims.

I claim:

1. That improvement in a cutting tool and mounting assembly wherein said mounting assembly is of the type having a holder and separable clamping member formed from bar stock, said clamping member being substantially shorter than said holder and having a semi-cylindrical recess crosswise thereof facing toward a similar recess crosswise of an adjacent lateral edge of said holder and cooperating therewith to clamp the cylindrical mounting shank extending from one face of a circular cutting tool, the end of said clamping member remote from said recess being upset to form a self-centering fulcrum having an arcuate surface lying in a plane extending transversely thereof and bearing against the adjacent surface of said holder, a clamping screw extending through said holder and into a threaded bore in said clamping member closely beside said recesses, said improvement comprising a one-piece metal cutter and mounting shank of homogenous material said cutter being circular and formed with a deep notch to provide duplicate cutting edges at the opposite outer ends of said notch, the opposite ends of said notch lying in separate planes parallel to a respective diametric plane and on the remote sides of said diametric planes from one another, whereby either one of said cutting edges is selectively usable to continue the same cutting operation on the same work piece by clamping said cutter in place in said cutter mounting assembly from the opposite ends of said cooperating semi-cylindrical recesses with the new active cutting edge of said cutter clamped in the identical position relative to a work piece as the former active cutting edge.

2. That improvement defined in claim 1 characterized in that said holder and said separable clamping member are formed from bar stock of the same transverse width and the opposite lateral faces thereof being flush with one another so as to lie in common planes in the assembled position of said mounting assembly, and one face of said cutter lying in a plane normal to the axis of said shank and adapted to lie flush against either lateral face of said holder and clamping members when in proper assembled position.

3. That improvement defined in claim 2 characterized in that the opposite lateral faces of said holder and said clamping member are free of obstructions interfering with the mounting of said cutter flush against either lateral face of said mounting assembly.

4. That improvement defined in claim 1 characterized in that said clamping screw is located between said similar recesses for seating the shank of said cutter and said self-centering fulcrum.

* * * * *